US012007149B2

(12) United States Patent
Mitra et al.

(10) Patent No.: US 12,007,149 B2
(45) Date of Patent: Jun. 11, 2024

(54) EXPANSION CONTROL SYSTEM ON A CENTRIFUGAL CHILLER WITH AN INTEGRAL SUBCOOLER

(71) Applicant: Carrier Corporation, Palm Beach Gardens, FL (US)

(72) Inventors: Biswajit Mitra, Huntersville, NC (US); Hsihua Li, Huntersville, NC (US); Macey Parrott, Charlotte, NC (US); Prashant Patel, Huntersville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/889,505

(22) Filed: Aug. 17, 2022

(65) Prior Publication Data

US 2023/0056234 A1 Feb. 23, 2023

Related U.S. Application Data

(60) Provisional application No. 63/235,478, filed on Aug. 20, 2021.

(51) Int. Cl.
*F25B 41/20* (2021.01)
*F25B 40/02* (2006.01)
*F25B 41/31* (2021.01)
*F25B 41/34* (2021.01)
*F25B 49/02* (2006.01)

(52) U.S. Cl.
CPC .............. *F25B 41/31* (2021.01); *F25B 40/02* (2013.01); *F25B 41/20* (2021.01); *F25B 41/34* (2021.01); *F25B 49/02* (2013.01); *F25B 2400/0411* (2013.01); *F25B 2600/2501* (2013.01); *F25B 2600/2513* (2013.01)

(58) Field of Classification Search
CPC .......... F25B 40/02; F25B 41/20; F25B 41/31; F25B 41/34; F25B 49/02; F25B 2400/0411; F25B 2600/2501; F25B 2600/2513
See application file for complete search history.

(56) References Cited

U.S. PATENT DOCUMENTS

| | | |
|---|---|---|
| 8,752,398 B2 | 6/2014 | Casas Noriega et al. |
| 9,283,517 B2 | 3/2016 | Van Dijck et al. |
| 9,869,492 B2 | 1/2018 | Zimmermann |
| 9,897,356 B2 | 2/2018 | Graaf et al. |
| 10,378,796 B2 | 8/2019 | Fredslund et al. |
| 10,907,845 B2 | 2/2021 | Hancock |

(Continued)

FOREIGN PATENT DOCUMENTS

| | | |
|---|---|---|
| CN | 2901189 Y | 5/2007 |
| CN | 106004329 A | 10/2016 |

(Continued)

OTHER PUBLICATIONS

European Search Report for Application No. 22191312.2; dated Dec. 22, 2022; 8 Pages.

*Primary Examiner* — Jonathan Bradford
(74) *Attorney, Agent, or Firm* — CANTOR COLBURN LLP (57) ABSTRACT

A vapor compression system including: a condenser; an evaporator; and an expansion control system on the main flowpath between the condenser and the evaporator, wherein the expansion control system further includes: one or more electronic expansion valves; and a modulated ball valve.

15 Claims, 2 Drawing Sheets

(56) References Cited

U.S. PATENT DOCUMENTS

| | | | |
|---|---|---|---|
| 2007/0261432 A1 | 11/2007 | Hamanaka et al. | |
| 2010/0199715 A1 | 8/2010 | Lifson et al. | |
| 2011/0048046 A1 | 3/2011 | Sommer et al. | |
| 2012/0111036 A1* | 5/2012 | Campbell | F25B 49/02 62/434 |
| 2015/0247658 A1* | 9/2015 | Cosby, II | F25B 39/04 62/506 |
| 2017/0144103 A1* | 5/2017 | Kooyman | F25B 41/34 |
| 2019/0017730 A1 | 1/2019 | Matsukura et al. | |
| 2020/0361279 A1 | 11/2020 | Tan | |

FOREIGN PATENT DOCUMENTS

| | | |
|---|---|---|
| CN | 106765564 A | 5/2017 |
| CN | 109059335 A | 12/2018 |
| CN | 210569326 U | 5/2020 |
| CN | 108180682 B | 6/2020 |
| EP | 1050724 A2 | 11/2000 |
| EP | 2199706 B1 | 1/2018 |
| EP | 3267130 B1 | 10/2019 |
| JP | 2003336914 A | 11/2003 |
| KR | 101544880 B1 | 8/2015 |
| KR | 101906833 B1 | 10/2018 |
| WO | 2017123598 A1 | 7/2017 |
| WO | 18189826 A1 | 10/2018 |

\* cited by examiner

EXPANSION CONTROL SYSTEM ON A CENTRIFUGAL CHILLER WITH AN INTEGRAL SUBCOOLER

CROSS-REFERENCE TO RELATED APPLICATIONS

This application claims the benefit of Provisional Application No. 63/235,478 filed Aug. 20, 2021, the disclosure of which is incorporated herein by reference in its entirety.

BACKGROUND

The embodiments herein generally relate to refrigerant vapor compression systems and, more particularly, to increase the capacity of expansion valves in a refrigerant vapor compression system.

Refrigerant vapor compression systems are well known in the art and commonly used for conditioning air to be supplied to a climate controlled comfort zone within a residence, office building, hospital, school, restaurant or other facility. Refrigerant vapor compression system are also commonly used in refrigerating air supplied to display cases, merchandisers, freezer cabinets, cold rooms, or other perishable/frozen product storage areas in commercial establishments.

Traditionally, conventional refrigerant vapor compression systems commonly operate at subcritical refrigerant pressures and typically include a compressor, a condenser, and an evaporator, and expansion device, commonly an expansion valve, disposed upstream, with respect to refrigerant flow, of the evaporator and downstream of the condenser. These basic refrigerant system components are interconnected by refrigerant lines in a closed refrigerant circuit, arranged in accord with known refrigerant vapor compression cycles, and operated in the subcritical pressure range for the particular refrigerant in use. Refrigerant vapor compression systems operating in the subcritical range are commonly charged with fluorocarbon refrigerants such as, but not limited to, hydrochlorofluorocarbons (HCFCs), such as R22, and more commonly hydrofluorocarbons (HFCs), such as R134a, R410A, R404A and R407C.

BRIEF DESCRIPTION

According to one embodiment, a vapor compression system is provided. The vapor compression system including: a condenser; an evaporator; and an expansion control system on the main flowpath between the condenser and the evaporator, wherein the expansion control system further includes: one or more electronic expansion valves; and a modulated ball valve.

In addition to one or more of the features described above, or as an alternative, further embodiments may include that the modulated ball valve is located in a parallel refrigerant flow path with the one or more electronic expansion valves.

In addition to one or more of the features described above, or as an alternative, further embodiments may include that the one or more electronic expansion valves are each configured to perform fine flow control of a refrigerant through the main flowpath, and wherein the modulated ball valve is configured to perform coarse flow control of the refrigerant through the main flowpath.

In addition to one or more of the features described above, or as an alternative, further embodiments may include that the one or more electronic expansion valves are configured to close and open to any position between fully open and fully closed, and wherein the modulated ball valve is configured to close and open to set defined percentage open increment positions.

In addition to one or more of the features described above, or as an alternative, further embodiments may include a controller to control operation of the one or more electronic expansion valves and the modulated ball valve.

In addition to one or more of the features described above, or as an alternative, further embodiments may include an economizer along a main flowpath between the condenser and the expansion control system.

In addition to one or more of the features described above, or as an alternative, further embodiments may include that the expansion control system further includes: a ball valve junction point fluidly connecting the expansion control system to the economizer, an evaporator junction point fluidly connecting the expansion control system to the evaporator; a ball valve line extending from the ball valve junction point to the evaporator junction point, the modulated ball valve being located in the ball valve line; and an expansion valve line extending from the ball valve junction point to the evaporator junction point, the one or more electronic expansion valves being located in the expansion valve line, wherein the ball valve junction point being configured to split the main flowpath into the expansion valve line and the ball valve line, and wherein the evaporator junction point is configured to combine the expansion valve line and the ball valve line into the main flowpath.

In addition to one or more of the features described above, or as an alternative, further embodiments may include that the condenser further includes a subcooler located within the condenser.

According to another embodiment, a method of operating a vapor compression system is provided. The method including: detecting a surge, a low load, or a low lift situation in the vapor compression system; and metering a flow of a refrigerant through a main flowpath using one or more electronic expansion valves and a modulated ball valve based on the surge, the low load, or the low lift situation, wherein the modulated ball valve and the one or more electronic expansion valves are located in an expansion control system on the main flowpath between a condenser and an evaporator of the vapor compression system.

In addition to one or more of the features described above, or as an alternative, further embodiments may include that prior to the detecting the surge, the low load, or the low lift situation in the vapor compression system, the method further includes: metering the flow of the refrigerant through the main flowpath using the one or more electronic expansion valves and not the modulated ball valve.

In addition to one or more of the features described above, or as an alternative, further embodiments may include that the modulated ball valve is located in a parallel refrigerant flow path with the one or more electronic expansion valves.

In addition to one or more of the features described above, or as an alternative, further embodiments may include that the metering the flow of refrigerant through the main flowpath using the one or more electronic expansion valves and the modulated ball valve based on the surge, the low load, or the low lift situation further includes: performing, using the one or more electronic expansion valves, fine flow control of the refrigerant through the main flowpath, and performing, using the modulated ball valve, coarse flow control of the refrigerant through the main flowpath.

In addition to one or more of the features described above, or as an alternative, further embodiments may include that the performing, using the one or more electronic expansion valves, fine flow control of the refrigerant through the main flowpath further includes: adjusting the one or more electronic expansion valves to any position between fully open and fully closed.

In addition to one or more of the features described above, or as an alternative, further embodiments may include that the performing, using the modulated ball valve, coarse flow control of the refrigerant through the main flowpath further includes: adjusting the modulated ball valve to one or more set defined percentage open increment positions.

In addition to one or more of the features described above, or as an alternative, further embodiments may include that the expansion control system further includes: an economizer along a main flowpath between the condenser and the expansion control system.

In addition to one or more of the features described above, or as an alternative, further embodiments may include that the expansion control system further includes: a ball valve junction point fluidly connecting the expansion control system to the economizer; an evaporator junction point fluidly connecting the expansion control system to the evaporator; a ball valve line extending from the ball valve junction point to the evaporator junction point, the modulated ball valve being located in the ball valve line; and an expansion valve line extending from the ball valve junction point to the evaporator junction point, the one or more electronic expansion valves being located in the expansion valve line, wherein the ball valve junction point being configured to split the main flowpath into the expansion valve line and the ball valve line, and wherein the evaporator junction point is configured to combine the expansion valve line and the ball valve line into the main flowpath.

According to another embodiment, a computer program product tangibly embodied on a non-transitory computer readable medium is provided. The computer program product including instructions that, when executed by a processor, cause the processor to perform operations including: detecting a surge, a low load, or a low lift situation in a vapor compression system; and metering a flow of a refrigerant through a main flowpath using one or more electronic expansion valves and a modulated ball valve based on the surge, the low load, or the low lift situation, wherein the modulated ball valve and the one or more electronic expansion valves are located in an expansion control system on the main flowpath between a condenser and an evaporator of the vapor compression system.

In addition to one or more of the features described above, or as an alternative, further embodiments may include that prior to the detecting the surge, the low load, or the low lift situation in the vapor compression system, the operations further include: metering the flow of the refrigerant through the main flowpath using the one or more electronic expansion valves and not the modulated ball valve.

In addition to one or more of the features described above, or as an alternative, further embodiments may include that the metering the flow of refrigerant through the main flowpath using the one or more electronic expansion valves and the modulated ball valve based on the surge, the low load, or the low lift situation further includes: performing, using the one or more electronic expansion valves, fine flow control of the refrigerant through the main flowpath, and performing, using the modulated ball valve, coarse flow control of the refrigerant through the main flowpath.

In addition to one or more of the features described above, or as an alternative, further embodiments may include that the performing, using the one or more electronic expansion valves, fine flow control of the refrigerant through the main flowpath further includes: adjusting the one or more electronic expansion valves to any position between fully open and fully closed.

Technical effects of embodiments of the present disclosure include metering the flow of refrigerant through a main flow path between a condenser and an evaporator using an electronic expansion valve and modulated ball valve oriented in parallel flow paths with each other.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A vapor compression system typically includes a main expansion valve positioned downstream of the condenser and upstream of the evaporator. The system's main expansion valve may not be large enough or physically capable to handle surges or low lift situations in the vapor compression system, while maximizing capacity. The main expansion valve may be an electronic expansion valve. In an unduly large single electronic expansion valve would be needed to hand the surges and low lift situations. Two electronic expansion valves may be place in parallel but each of the two electronic expansion valves may still be unduly large. More electronic expansion valves may be placed in parallel to solve this problem. For example, three or four electric expansions valves may be placed in parallel. However, electric expansions valve open slowly and may be slow to respond the surges and low lift situations. In order to handle the surges and low lift situations relatively quickly the embodiments disclosed herein seek to place a modulated ball valve in parallel with an electronic expansion valve. Advantageously, modulated ball valves can adjust faster in response to surges and low lift situations by adjusting flow cross sections relatively faster.

Figure 1:
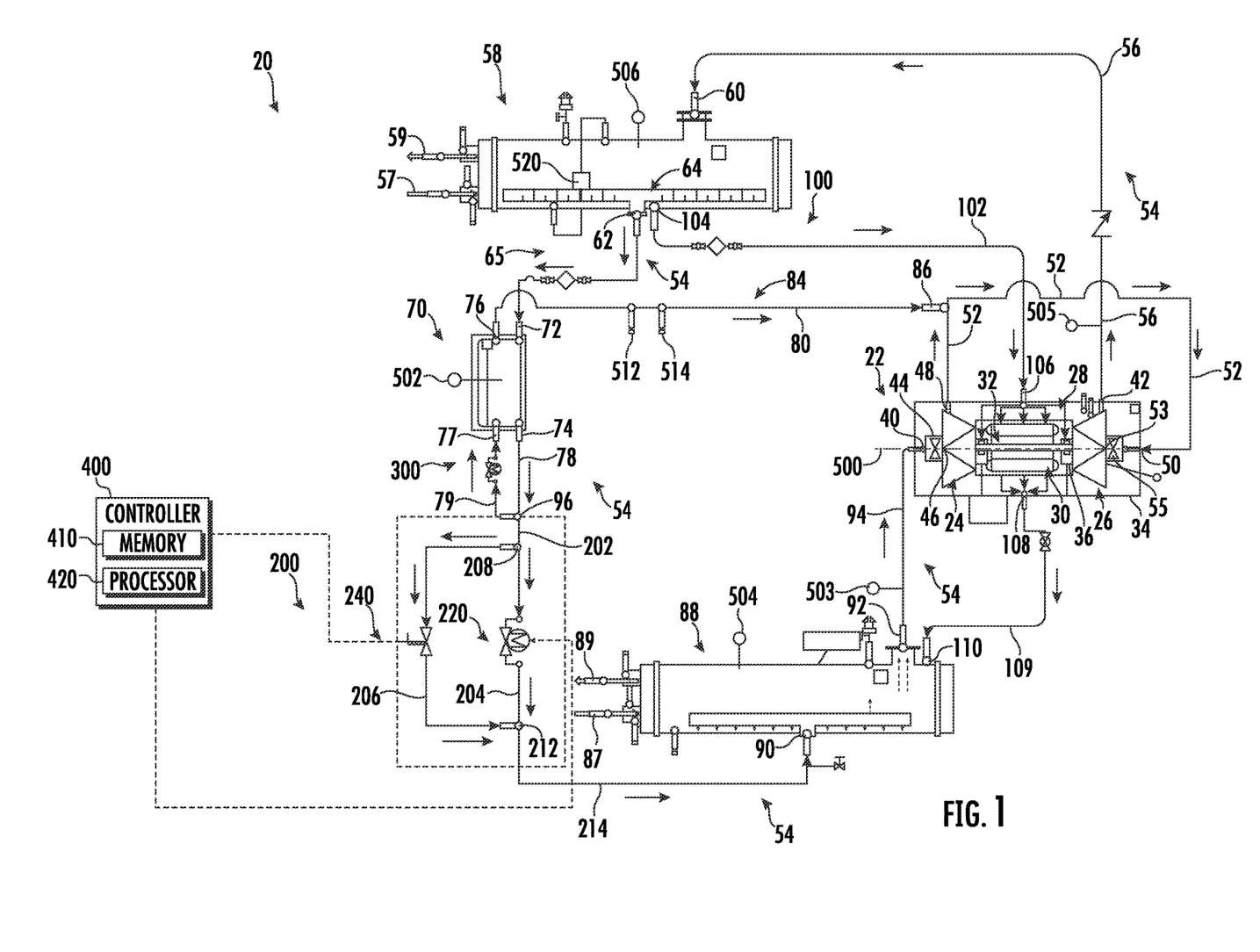
FIG. 1 is a schematic illustration of a vapor compression system, according to an embodiment of the present disclosure.

FIG. 1 shows a vapor compression system 20. FIG. 1 shows flow arrows (and thus associated valve conditions) associated with operating conditions that may correspond to a startup condition or, generally, a condition where there is a low pressure difference between condenser 58 and evaporator 88. Other operating conditions are discussed further below. The vapor compression system 20 may be viewed as a chiller having a compressor 22 driving a recirculating flow of refrigerant. The compressor 22 may be a two-stage centrifugal compressor having a first stage 24 and a second stage 26. Impellers of the two stages may be co-spooled and directly driven by an electric motor 28 having a stator 30 and a rotor 32. The compressor 22 has a housing or case 34 supporting one or more bearings 36 to in turn support the rotor 32 for rotation about its central longitudinal axis 500 forming a central longitudinal axis of the compressor 22. The bearings 36 may be rolling element bearings with one or more circumferential arrays of rolling elements radially sandwiched between an inner race on the rotor 32 (e.g., mounted to a shaft) and an outer race on the housing (e.g., press fit into a bearing compartment). Rolling elements may include balls, straight rollers (e.g., including needles), and tapered rollers. The bearings 36 may be hybrid bearings with steel races and ceramic rolling elements. The ceramic rolling elements may be silicon nitride ceramic balls.

The vapor compression system 20 illustrated in FIG. 1 may be an essentially oil or lubricant-free system. It is understood that while the vapor compression system 20 is illustrated as an oil or lubricant-free system, the embodiments disclosed herein are also applicable to vapor compressions systems that require oil or lubricants. Accordingly, it may omit various components of traditional oil systems such as dedicated oil pumps, oil separators, oil reservoirs, and the like. However, a very small amount of oil or other material that may typically be used as a lubricant may be included in the overall refrigerant charge to provide benefits that go well beyond the essentially non-existent amount of lubrication such material would be expected to provide. It is understood however, that the embodiments disclosed herein are also applicable to more traditional oil systems.

The compressor 22 has an overall inlet (inlet port or suction port) 40 and an overall outlet (outlet port or discharge port) 42. In the illustrated configuration, the outlet 42 is an outlet of the second stage 26. The inlet 40 is upstream of an inlet guide vane array 44 which is in turn upstream of the first stage inlet 46. The first stage outlet 48 is coupled to the second inlet 50 by an interstage line (interstage) 52. The second inlet 50 is upstream of an inlet guide vane array 55 which is in turn upstream of the second stage inlet 53. Another variation is a single stage compressor with inlet guide vanes.

As is discussed further below, additional flows of refrigerant may exit and/or enter the compressor 22 at additional locations. From the discharge port 42, a main refrigerant flowpath 54 proceeds downstream in a normal operational mode along a discharge line 56 to a first heat exchanger or a condenser 58. In the normal operational mode, the condenser 58 is a heat rejection heat exchanger. The condenser 58 is a refrigerant-water heat exchanger wherein refrigerant passes over tubes of a tube bundle which carry a flow of water (or other liquid). The condenser 58 includes a heat transfer fluid inlet 57 and a heat transfer fluid outlet 59 for the flows of water or other heat transfer fluid. The condenser 58 has one or more inlets and one or more outlets. The condenser 58 includes a primary inlet 60 and a primary outlet 62. The primary outlet 62 is an outlet of a sump 64 at the base of a vessel of the condenser 58. Additional sump 64 outlets are shown and discussed below. The sump 64 and the primary outlet 62 are part of a subcooler 65. The subcooler 65 has a bottom plate which is slightly above the base of a vessel of the condenser 58. The port 104 comes out of the base of a vessel of the condenser 58, which provides a liquid feed and cooling to the electric motor 28 When the modulated ball valve 240 opens a ball valve line the liquid refrigerant drains out of the subcooler 65 and there is a liquid and vapor mix of refrigerant in the main flowpath 54, which is why the modulated ball valve 240 and the ball valve line 206 also works as a hot gas bypass.

The vapor compression system 20 is an economized system having an economizer 70 downstream of the condenser 58 along the main flowpath 54. The economizer 70 is a brazed plate heat exchanger economizer having an inlet 72, an economizer liquid outlet 74, and a vapor outlet 76. In the illustrated implementation, the vapor outlet 76 is connected to an economizer line 80 defining an economizer flowpath 84 as a branch off the main flowpath 54 returning to an economizer port 86 of the compressor 22 which may be at the interstage 52.

The main flowpath 54 proceeds downstream from the economizer liquid outlet 74 through a economizer outflow line 78 and an expansion control inflow line 202 to an expansion control system 200. The economizer outflow line 78 is fluidly connected to the economizer 70 at the economizer liquid outlet 74. The expansion control inflow line 202 is fluidly connected to the economizer outflow line 78 at an economizer junction point 96. The economizer junction point 96 fluidly connects the expansion control system 200 to the economizer 70.

An economizer return line 79 may fluidly connect the economizer junction point 96 to an economizer return inlet port 77. The economizer return electronic expansion valve 300 may be located in the economizer return line 79. The economizer return electronic expansion valve 300 may be in an off position to prevent the flow of refrigerant back into the economizer 70. The economizer return electronic expansion valve 300 may be in an on or open position and configured to return a selected amount of refrigerant back into the economizer 70 through the economizer return inlet port 77. The economizer return electronic expansion valve 300 which takes a stream of refrigerant from the economizer junction point 96 and meters it through the economizer return line 79 into an evaporator side of the economizer 70. A pressure sensor 512 may be located on or in the economizer line 80 and configured to detect a pressure of the refrigerant within the economizer line 80. A temperature sensor 514 may be located on or in the economizer line 80 and configured to detect a temperature of the refrigerant within the economizer line 80. The temperature in the economizer line 80 and the pressure within the economizer liner 80 may help provide an indication of a superheat reading to a controller 400 and the controller 400 may be configured to adjust the economizer return electronic expansion valve 300 in response to the temperature and the pressure within the economizer liner 80. The expansion control inflow line 202 is connected to a ball valve junction point 208 that is configured to split the main flowpath 54 into an expansion valve line 204 and a ball valve line 206. The expansion valve line 204 extends from the ball valve junction point 208 to an evaporator junction point 212. The ball valve line 206 extends from the ball valve junction point 208 to an evaporator junction point 212. The evaporator junction point 212 fluidly connects the expansion control system 200 to the evaporator 88. An evaporator inflow line 214 connects the evaporator junction point 212 to an inlet 90 of the evaporator 88. The evaporator junction point 212 is configured to combine the expansion valve line 204 and the ball valve line 206 into the main flowpath 54 or the evaporator inflow line 214.

The expansion control system 200 may be located between the economizer junction point 96 and the evaporator junction point 212. The expansion control system 200 includes one or more electronic expansion valves 220 and a modulated ball valve 240. The electronic expansion valve 220 is located in the expansion valve line 204 and the modulated ball valve 240 is located in the ball valve line 206. It is understood that while only one electronic expansion valve 220 is illustrated, the embodiments described herein are applicable to vapor compressions system 20 having any number of electronic expansion valves 220 and each electronic expansion valve 220 may be located in its own expansion valve line 204. Further, the electronic expansion valve 220 may be oriented in parallel to the other electronic expansion valves utilized and also parallel to the modulated ball valve 240. In an embodiment, two electronic expansion valve 220 may be utilized.

The vapor compression system 20 may be configured to use the electronic expansion valve 220 as the main or only metering device for normal operation while the modulated ball valve 240 remains in the closed position thus blocking flow of refrigerant through the ball valve line 206.

However due to the limited size of the electronic expansion valve 220, the vapor compression system 20 may not be able achieve 100% capacity at lower lifts or during surges.

A low lift may be described as when the difference between a temperature of cooling water leaving the condenser 58 and a temperature of cooling water leaving the evaporator 88 is within 9° F.

Surge is a phenomena on the centrifugal compressor when the pressure differential across the compressor is high but the load is less. In this scenario the refrigerant flow may start going in the reverse direction, from condenser 58 to evaporator 88 through the compressor 58. An electronic expansion valve 220 alone is slow to respond to a surge. To respond fast to a surge, the modulated ball valve 240 may be opened across the electronic expansion valve 220.

The modulated ball valve 240 may suffice as the only expansion valve to adjust refrigerant flow during a surge. This is because during a surge the subcooler 65 is drained of the liquid refrigerant and there is large amount of vapor refrigerant that exits the condenser 58 also along with liquid refrigerant. This large amount of vapor can choke the electronic expansion valve 220 during a surge. Thus, during a surge the movement of the electronic expansion valve 220 is frozen by the controls and the modulated ball valve 240 takes over the operation and manages the flow of refrigerant until the compressor 22 gets out of the surge. The modulated ball valve 240 across the electronic expansion valve 220 operates similar to a hot gas bypass and introduces an artificial load on the system so the compressor 22 can run at a higher load and get out of the surge.

The modulated ball valve 240 may operate as a hot gas to achieve low loads. Low loads may be considered to be less than 20% of the vapor compression system 20 load at any lift. Typically the vapor compression system 20 unloads by reducing the speed of the compressor 22. Then when the compressor 22 goes to minimum speed the load is further reduced by the inlet guide vane array 44, 55. Then when the inlet guide vane array 44, 55 is at minimum the electronic expansion valve 220 is frozen and the modulated ball valve 240 is opened. This causes the liquid refrigerant to drain out of the subcooler 65 and the create a situation same as hot gas bypass. This further lowers the cooling load.

The modulated ball valve 240 is configured to aid the vapor compression system 20 achieve 100% capacity in lower lifts. The modulated ball valve 240 is located in a parallel refrigerant flow path with the electronic expansion valve 220. Advantageously, the modulated ball valve 240 adds large flow capacity to the main flowpath 54, which is not possible by an electronic expansion valve alone due to unavailability of such large size electronic expansion valves.

The modulated ball valve 240 is configured to provide coarse refrigerant flow control while the electronic expansion valve 220 is configured to provide fine flow control. Coarse flow control may be defined to mean that the modulated ball valve 240 is configured to close and open in defined percentage increments but may not be able to open to a percentage between the set defined percentage open increments. For example, the modulated ball valve 240 may have 11 set positions includes 0% open (i.e., closed), 10% open, 20% open, 30% open, 40% open, 50% open, 60% open, 70% open, 80% open, 90% open, and 100% open. But the modulated ball valve 240 may not be able to open between 0%-10% open, 10%-20% open, 20%-30% open, 30%-40% open, 40%-50% open, 50%-60% open, 60%-70% open, 70%-80% open, 80%-90% open, or 90-100% open. In another example, the modulated ball valve 240 may have 21 set positions includes 0% open (i.e., closed), 5% open, 10% open, 15% open, 20% open, 25% open, 30% open, 35% open, 40% open, 45% open, 50% open, 55% open, 60% open, 65% open, 70% open, 75% open, 80% open, 85% open, 90% open, 95% open, and 100% open. It is understood that that values being utilized here for the set defined percentage open increment positions of the modulated ball valve 240 are exemplary in nature and the modulated ball valve 240 may have different set defined percentage open increment positions, more or less set defined percentage open increment positions, or different increments between the set defined percentage open increment positions. Fine flow control may be defined as being able to achieve an open position between 0%-100% open. In other words, the electronic expansion valve 220 is configured to close and open to any position between fully open and fully closed.

There may be a time gap between a jump from a first set defined percentage open increment position to a second set defined percentage open increment position. For example, the time gap may be about 60 seconds. Further, the jump between the first set defined percentage open increment position to a second set defined percentage open increment position may only occur when the electronic expansion valve 220 is higher than a selected percentage open position max threshold.

For example, the electronic expansion valve 220 may have a selected percentage open position min threshold of 30% open and a selected percentage open position max threshold of 80% open. Then the modulated ball valve 240 may be allowed to open 5% every 60 secs if the electronic expansion valve 220 continues to stay above 80% opening. If the modulated ball valve 240 is opened to about 40% open and the electronic expansion valve 220 is below 80% open then the modulated ball valve 240 freezes until the electronic expansion valve 220 goes below 30% open. Once the electronic expansion valve 220 goes below 30% open then the modulated ball valve 240 starts closing 5% every 60 secs. However, the electronic expansion valve 220 goes above 30% open then the modulated ball valve 240 will freeze.

The modulated ball valve 240 is configured to open in steps of defined percentage increments as an augmentation to the electronic expansion valve 220 in low lift operations when the electronic expansion valve 220 may be close to a max opening, which advantageously increases refrigerant flow and allow for higher capacities. The electronic expansion valve 220 is configured to perform fine control to maintain smooth operation while the modulated ball valve 240 opens in the steps. Fine control may be further defined as having a multitude of small steps and in comparison to the few and larger steps of the modulated ball valve 240. For example, the electronic expansion valve 220 may have about 3000 steps and each step change may be 0.03% open, which can change continuously. This is as opposed to the modulated ball valve 240 which may have steps in increments of 5% open or 10% open and which may change every 60 seconds and not continuously.

The modulated ball valve 240 is configured to open in steps of defined percentage increments as an augmentation to the electronic expansion valve 220 to respond fast to the chillers surge control, which advantageously alters the mass flow of the compressor 22 to put it in a more stable operating state.

In an embodiment of the vapor compression system 20, the control system includes a controller 400 and a plurality of flow control devices operatively associated with the various refrigerant lines.

The controller 400 may be an electronic controller including a processor 420 and an associated memory 410 comprising computer-executable instructions (i.e., computer program product) that, when executed by the processor 420, cause the processor 420 to perform various operations. The processor 420 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 410 may be but is not limited to a random access memory (RAM), read only memory (ROM), or other electronic, optical, magnetic or any other computer readable medium.

In operation, the controller 400 selectively controls the positioning of each of the plurality of flow control devices between its respective open and closed positions to selectively direct refrigerant flow through the various refrigerant lines. The plurality of flow control devices includes at least the electronic expansion valve 220 and the modulated ball valve 240.

The controller 400 is configured to control operation of the electronic expansion valve 220 and the modulated ball valve 240. The controller 400 may also monitor various operating parameters by means of various sensors operatively associated with the controller 400 and disposed at selected locations throughout the system. For example, in the embodiments depicted in FIG. 1, a temperature sensor 503 and a pressure sensor 504 are provided to sense the refrigerant suction temperature and pressure, respectively, and a temperature sensor 505 and a pressure sensor 506 are provided to sense refrigerant discharge temperature and pressure, respectively. The pressure sensors 504, 506 may be conventional pressure sensors, such as for example, pressure transducers, and the temperature sensors 503 and 505 may be conventional temperature sensors, such as for example, thermocouples or thermistors.

There may also be a liquid sensor 520 operably connected to the condenser 58. If the liquid level goes up in the condenser 58 then the electronic expansion valve 220 opens and if the liquid level goes down in the condenser 58 then the electronic expansion valve 220 closes. The target liquid level may vary depending on condition. The electronic expansion valve 220 and the modulated ball valve 240 may also be controlled using a percent opening of the inlet guide vane arrays 44, 55, a speed of the compressor 22, and pressures of the evaporator 88 and the condenser 58.

The main flowpath 54 proceeds downstream through the evaporator inflow line 214 to evaporator 88. In the normal operational mode, the evaporator 88 is a heat absorption heat exchanger. In the illustrated chiller implementation, the evaporator 88 is a refrigerant-water heat exchanger which may have a vessel and tube bundle construction wherein the tube bundle carries the water or other liquid being cooled in the normal operational mode. The evaporator 88 includes a heat transfer fluid inlet 87 and a heat transfer fluid outlet 89 for the flows of water or other heat transfer fluid. The evaporator 88 has a main outlet 92 connected to a suction line 94 which completes the main flowpath 54 returning to the inlet 40.

Several additional optional flowpaths and associated conduits and other hardware are shown branching off from and returning to the main flowpath 54. In addition to the economizer flowpath 84, a subcooler or motor cooling flowpath 100 also branches off from and returns to the main flowpath 54. The motor cooling flowpath 100 includes a line 102 extending from an upstream end at a port 104 on the sump 64. The line 102 extends to a cooling port 106 on the compressor 22. The motor cooling flowpath 100 passes through the cooling port 106 into a motor case 34 of the compressor 22. In the motor case 34, the cooling flow cools the stator 30 and rotor 32 and then exits a drain port 108. Along the motor cooling flowpath 100, a motor cooling return line 109 returns from the drain port 108 to the main flowpath 54. In this example, it returns to a port 110 on the vessel of the evaporator 88.

The overall circulating refrigerant mixture may be any refrigerant known to one of skill in the art.

Figure 2:
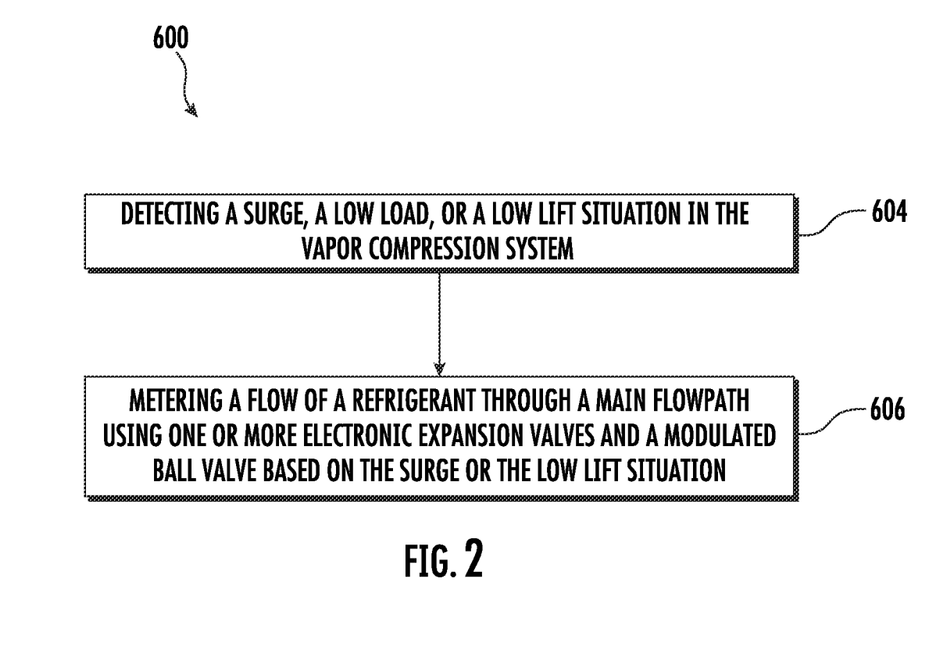
FIG. 2 is a flow diagram illustrating a method of operating the vapor compression system of FIG. 1, according to an embodiment of the present disclosure.

Referring now also to FIG. 2, which shows a flow diagram illustrating a method 600 of operating the vapor compression system 20 of FIG. 1. In an embodiment, the method 600 may be performed and/or controlled by the controller 400.

A block 604, a surge, a low load, or a low lift situation is detected in the vapor compression system 20.

Surge and the stages of surge may be detected by a complex algorithm which considers pressure sensor readings from the evaporator 88 using the pressure sensor 504 and pressure sensor readings from the condenser 58 using the pressure sensor 506. Then the controller 400 may also use a speed of the compressor 22 and an opening size of the inlet guide vane array 44, 55, temperature of water from the evaporator 88 temps to determine how to handle the surge.

First the controller 400 may try to mitigate and not go into surge by controlling speed of the compressor 22 and an opening size of the inlet guide vane array 44, 55. If that does not work, then the controller 400 may open up the modulated ball valve 44 and freeze one or more electronic expansion valves 220 to alter compressor loading to control surge. A low lift situation may be detected when the one or more electronic expansion valves 220 opens up to a high threshold.

A low load situation may be detected when the speed of the compressor 22 is minimized, the inlet guide vane array 44, 55 is at its lowest setting and still the chiller has more cooling capacity than desired. In this case the controller 400 opens up the modulated ball valve 240 to further reduce the load by bypassing hot gas.

At block 606, metering the flow of a refrigerant through a main flowpath 54 using one or more electronic expansion valves 220 and a modulated ball valve 240 based on the surge, the low load, or the low lift situation. Block 606 may further include that the one or more electronic expansion valves 220 performs fine flow control of the refrigerant through the main flowpath 54 and the modulated ball valve 240 performs coarse flow control of the refrigerant through the main flowpath 54. The fine flow control of the refrigerant may be performed by the one or more electronic expansion valves 220 by adjusting the one or more electronic expansion valves 220 to any position between fully open and fully closed. The coarse flow control of the refrigerant may be performed by the modulated ball valve 240 by adjusting the modulated ball valve 240 to one or more set defined percentage open increment positions.

The modulated ball valve 240 and the one or more electronic expansion valves 220 are located in an expansion control system 200 on the main flowpath 54 between a condenser 58 and an evaporator 88 of the vapor compression system 20.

The method 600 may further include block 604 that the flow of the refrigerant is metered through the main flowpath 54 using the one or more electronic expansion valves 220 and not the modulated ball valve 240. As previously discussed, the vapor compression system 20 may use the one or more electronic expansion valves 220 for normal operations and not the modulated ball valve 240.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vapor compression system comprising:
a condenser;
an evaporator; and
an expansion control system on the a main flowpath between the condenser and the evaporator, wherein the expansion control system further comprises:
one or more electronic expansion valves; and
a modulated ball valve;
wherein the modulated ball valve is located in a refrigerant flow path that is in parallel with the one or more electronic expansion valves;
wherein the expansion control system further comprises:
an economizer along the main flowpath between the condenser and the expansion control system;
a ball valve junction point fluidly connecting the expansion control system to the economizer;
an evaporator junction point fluidly connecting the expansion control system to the evaporator;
a ball valve line extending from the ball valve junction point to the evaporator junction point, the modulated ball valve being located in the ball valve line; and
an expansion valve line extending from the ball valve junction point to the evaporator junction point, the one or more electronic expansion valves being located in the expansion valve line,
wherein the ball valve junction point is configured to split the main flowpath into the expansion valve line and the ball valve line, and
wherein the evaporator junction point is configured to combine the expansion valve line and the ball valve line into the main flowpath.

2. The vapor compression system of claim 1, wherein the one or more electronic expansion valves are each configured to perform fine flow control of a refrigerant through the main flowpath, and
wherein the modulated ball valve is configured to perform coarse flow control of the refrigerant through the main flowpath.

3. The vapor compression system of claim 1, wherein the one or more electronic expansion valves are configured to close and open to any position between fully open and fully closed, and
wherein the modulated ball valve is configured to close and open to set defined percentage open increment positions.

4. The vapor compression system of claim 1, further comprising:
a controller to control operation of the one or more electronic expansion valves and the modulated ball valve.

5. The vapor compression system of claim 1, wherein the condenser further comprises a subcooler located within the condenser.

6. A method of operating a vapor compression system, the method comprising:
detecting a surge, a low load, or a low lift situation in the vapor compression system; and metering a flow of a refrigerant through a main flowpath using one or more electronic expansion valves and a modulated ball valve based on the surge, the low load, or the low lift situation, wherein the modulated ball valve and the one or more electronic expansion valves are located in an expansion control system on the main flowpath between a condenser and an evaporator of the vapor compression system;

wherein the expansion control system further comprises:

an economizer along the main flowpath between the condenser and the expansion control system;

a ball valve junction point fluidly connecting the expansion control system to the economizer;

an evaporator junction point fluidly connecting the expansion control system to the evaporator;

a ball valve line extending from the ball valve junction point to the evaporator junction point, the modulated ball valve being located in the ball valve line; and an expansion valve line extending from the ball valve junction point to the evaporator junction point, the one or more electronic expansion valves being located in the expansion valve line, wherein the ball valve junction point is configured to split the main flowpath into the expansion valve line and the ball valve line, and wherein the evaporator junction point is configured to combine the expansion valve line and the ball valve line into the main flowpath.

7. The method of claim 6, wherein prior to the detecting the surge, the low load, or the low lift situation in the vapor compression system, the method further comprises:

metering the flow of the refrigerant through the main flowpath using the one or more electronic expansion valves and not the modulated ball valve.

8. The method of claim 6, wherein the modulated ball valve is located in a refrigerant flow path that is in parallel with the one or more electronic expansion valves.

9. The method of claim 7, wherein the metering the flow of refrigerant through the main flowpath using the one or more electronic expansion valves and the modulated ball valve based on the surge, the low load, or the low lift situation further comprises:

performing, using the one or more electronic expansion valves, fine flow control of the refrigerant through the main flowpath, and performing, using the modulated ball valve, coarse flow control of the refrigerant through the main flowpath.

10. The method of claim 9, wherein the performing, using the one or more electronic expansion valves, fine flow control of the refrigerant through the main flowpath further comprises:

adjusting the one or more electronic expansion valves to any position between fully open and fully closed.

11. The method of claim 9, wherein the performing, using the modulated ball valve, coarse flow control of the refrigerant through the main flowpath further comprises:

adjusting the modulated ball valve to one or more set defined percentage open increment positions.

12. A computer program product tangibly embodied on a non-transitory computer readable medium, the computer program product including instructions that, when executed by a processor, cause the processor to perform operations comprising the method of claim 6.

13. The computer program product of claim 12, wherein prior to the detecting the surge, the low load, or the low lift situation in the vapor compression system, the operations further comprise:

metering the flow of the refrigerant through the main flowpath using the one or more electronic expansion valves and not the modulated ball valve.

14. The computer program product of claim 12, wherein the metering the flow of refrigerant through the main flowpath using the one or more electronic expansion valves and the modulated ball valve based on the surge, the low load, or the low lift situation further comprises:

performing, using the one or more electronic expansion valves, fine flow control of the refrigerant through the main flowpath, and performing, using the modulated ball valve, coarse flow control of the refrigerant through the main flowpath.

15. The computer program product of claim 14, wherein the performing, using the one or more electronic expansion valves, fine flow control of the refrigerant through the main flowpath further comprises:

adjusting the one or more electronic expansion valves to any position between fully open and fully closed.

\* \* \* \* \*